Dec. 17, 1968 S. MIHOJEVICH ET AL 3,416,860

ELECTROSTATIC PRINTER

Filed June 11, 1965 11 Sheets-Sheet 1

STEVEN MIHOJEVICH
ARTHUR S. ZERFAHS
RALPH G. OSTENSEN
ALBIN F. BERGGREN, JR.
RONALD A. GLASER
INVENTORS

BY

Pennie, Edmonds, Morton Taylor & Adams

STEVEN MIHOJEVICH
ARTHUR S. ZERFAHS
RALPH G. OSTENSEN
ALBIN F. BERGGREN, JR.
RONALD A. GLASER
*INVENTORS*

BY Pennie, Edmonds, Morton, Taylor & Adams

STEVEN MIHOJEVICH
ARTHUR S. ZERFAHS
RALPH G. OSTENSEN
ALBIN F. BERGGREN, JR.
RONALD A. GLASER
INVENTORS

BY

Pennie, Edmonds, Morton, Taylor & Adams

STEVEN MIHOJEVICH
ARTHUR S. ZERFAHS
RALPH G. OSTENSEN
ALBIN F. BERGGREN, JR.
RONALD A. GLASER
INVENTORS

BY

Pennie, Edmonds, Morton, Taylor & Adams

ELECTROSTATIC PRINTER

STEVEN MIHOJEVICH
ARTHUR S. ZERFAHS
RALPH G. OSTENSEN
ALBIN F. BERGGREN, JR.
RONALD A. GLASER
INVENTORS

BY

Pennie, Edmonds, Morton, Taylor & Adams

STEVEN MIHOJEVICH
ARTHUR S. ZERFAHS
RALPH G. OSTENSEN
ALBIN F. BERGGREN, JR.
RONALD A. GLASER
INVENTORS

BY

Pennie, Edmonds, Morton, Taylor & Adams

STEVEN MIHOJEVICH
ARTHUR S. ZERFAHS
RALPH G. OSTENSEN
ALBIN F. BERGGREN, JR.
RONALD A. GLASER
*INVENTORS*

BY

Rennie, Edmonds, Morton, Taylor & Adams

Dec. 17, 1968 S. MIHOJEVICH ET AL 3,416,860

ELECTROSTATIC PRINTER

Filed June 11, 1965 11 Sheets-Sheet 8

STEVEN MIHOJEVICH
ARTHUR S. ZERFAHS
RALPH G. OSTENSEN
ALBIN F. BERGGREN, JR.
RONALD A. GLASER
*INVENTORS*

BY

Pennie, Edmonds, Morton, Taylor & Adams

Dec. 17, 1968 S. MIHOJEVICH ET AL 3,416,860

ELECTROSTATIC PRINTER

Filed June 11, 1965 11 Sheets-Sheet 9

STEVEN MIHOJEVICH
ARTHUR S. ZERFAHS
RALPH G. OSTENSEN
ALBIN F. BERGGREN, JR.
RONALD A. GLASER
*INVENTORS*

BY

Rennie, Edmonds, Morton, Taylor & Adams

STEVEN MIHOJEVICH
ARTHUR S. ZERFAHS
RALPH G. OSTENSEN
ALBIN F. BERGGREN, JR.
RONALD A. GLASER
*INVENTORS*

BY
Pirnie, Edmonds, Morton, Taylor & Adams

STEVEN MIHOJEVICH
ARTHUR S. ZERFAHS
RALPH G. OSTENSEN
ALBIN F. BERGGREN, JR.
RONALD A. GLASER
*INVENTORS*

*BY*
Pennie, Edmonds, Morton, Taylor & Adams

United States Patent Office 3,416,860 Patented Dec. 17, 1968

3,416,860

ELECTROSTATIC PRINTER

Steven Mihojevich, Northbrook, Arthur S. Zerfahs, Elk Grove, Ralph G. Ostensen, Morton Grove, Albin F. Berggren, Jr., Des Plaines, and Ronald A. Glaser, Arlington Heights, Ill., assignors to SCM Corporation, a corporation of New York Filed June 11, 1965, Ser. No. 463,071
4 Claims. (Cl. 355—10)

ABSTRACT OF THE DISCLOSURE

An electrostatic printing machine having an exposure station and an imaging station, and having: illumination means adjacent the exposure station and an optical system for projecting an entire image of subject matter placed at the exposure station to the imaging station, copy sheet supply means for the storage of photoconductive copy sheets, means for moving a copy sheet from said supply means to charging means and from the charging means to the imaging station, said charging means actuatable to place an electrical charge on said copy sheet, means activated by the moving copy sheet to energize the illumination means and timing means to control the amount of illumination projected onto a copy sheet at the imaging station to selectively discharge the electrical charge thereon. The illumination means and optical system can advantageously provide a reflective image at the imaging station, where the means for moving the copy sheets is stopped and vacuum means retain the copy sheet at the imaging station. The selectively discharged copy sheet can be advantageously developed by depositing charged coloring matter from a liquid toner system comprising a tray having a curved bottom wall a reservoir beneath said tray, means for circulating liquid toner therebetween, roller feed means, roller exit means including squeegee rollers, level indicating means and means for periodically replenishing the supply of charged coloring matter in the toner.

This invention relates to photocopy apparatus of the electrostatic type. More particularly it refers to a type of photocopy apparatus wherein an object desired to be copied may be positioned at a fixed station and the reflected image of the object is projected onto a charged photoconductive surface.

In the electrostatic photocopy system used by this invention a uniform electrostatic charge is first applied to a paper copy sheet having a photoconductive surface. The image of the subject matter desired to be copied is then projected onto the charged photoconductive surface, selectively discharging the electrostatic charge and reproducing the image in latent form on the photoconductive surface. Areas of the sheet corresponding to areas of the original subject matter having intermediate shade will retain varying proportions of the original charge. The latent electrostatic image is then developed by applying to the photoconductive surface of the copy paper colored particles having a charge opposite in polarity to the charge on the copy paper surface, so that the particles are attracted to the charged portions of the latent image to product a visible image—the substantial duplicate of the original. Finally, this visible image is fixed to the paper surface by heat or other suitable means.

Previously, electrostatic photocopies using a photoconductive copy sheet have transported both the original document to be copied and the copy sheet simultaneously past object and image windows, respectively, in a projection station whereby the document is illuminated and projected line by line on to the copy sheet. Such an apparatus is described in U.S. patent application S.N.

248,249, "Photocopy Apparatus," filed Jan. 3, 1963, by Ralph G. Ostensen, and assigned to the assignee of this invention. In such an apparatus the movement of the original document and the copy sheet must be carefully synchronized. Moreover, the original matter to be copied must be a thin, flexible document capable of passing through a conveyor belt or roller assembly transport mechanism. This narrows the potential application of such an apparatus, notably eliminating the copying of bound books or bulky periodicals.

The present invention provides an electrostatic photocopier which projects the complete image of the original subject matter onto the surface of a copy sheet at one time, rather than line by line as in the previous apparatus. By projecting an entire image at one time the subject document and the copy sheet may be held stationary, and complex synchronization problems are eliminated. Since the subject document is not moved during the copying it need not be of any particular form or thickness necessary to pass through rollers or the like; books or other bulky material may be readily copied.

To achieve sufficient illumination of the original document to permit projecting an entire image at one time, the invention makes use of iodine quartz lamps. These devices have a tungsten filament in a quartz envelope in which a small amount of iodine gas is placed. When the particles of tungsten evaporate from the lamp filament they combine with the iodine gas in the lamp to form tungsten iodide. When this substance comes into contact with the hot filament the heat frees the iodine, causing the tungsten to be redeposited on the filament. In this manner the life of the lamp is greatly extended, and such lamps have ratings of 2000 hours in contrast to comparable projection or photo-flood lamp ratings of from 5 to 50 hours. The iodine quartz lamps provide the necessary amount of illumination at the proper color temperature over an entire document surface to transmit sufficient light to discharge the photo-conductive surface of a copy sheet.

The invention further provides means for holding a coated copy sheet in a stationary imaging position to receive the entire projected image at one time with no image shielding projection on or in contact with the coated surface of the copy sheet. A vacuum belt transport system is arranged to transport the coated copy sheet through a portion of the copy machine on perforated belts without contacting the coated surface of the sheet. Means for stopping and starting the perforated belts at predetermined positions while the copy sheet remains attached to the belts are also included.

To prevent lateral misregistration of the copy sheet on the perforated belts tracking and centering means are provided to retain the belts at a spaced distance apart from one another. A backing member for the perforated belts, including a vacuum platen having an air exhausting mechanism and having openings in one wall of the platen which may register with the openings in the perforated belts to provide a pressure differential, serves to secure the copy sheet to the front surface of the belts.

Means for aligning the edges of the copy sheet with the image of the edges of the object to be copied are included in the copying machine. A plurality of feed magazines to store and selectively distribute various sizes of copy sheets for use in the copying cycle are provided. Adjustable guides are arranged in the magazines for properly positioning the various widths of copy sheets, and, in particular, one guide in each magazine has two alternate fixed positions while the other guide is adjustable with respect to either of the two fixed positions so as to fix the position of one side edge of the copy sheet relative to the machine.

The magazines are equipped with support means under the copy sheet stacks to centrally engage the underside of each stack near its leading edge to prevent or inhibit sagging due to the side edges of the stack being raised slightly by the guides.

Means are provided for sensing the level or number of copy sheets in each magazine and for giving a sensible signal when the supply in a magazine is exhausted. Also provided are means for selecting and activating a feed mechanism in one or another of the magazines, and means to prevent activation of the feed mechanism in a particular magazine if the supply of copy sheets in that magazine is exhausted.

The machine also has means for adjusting and focusing the projected image at selective points in the optics path.

Also furnished are means for periodically replacing or replenishing selected ingredients of the liquid toner used in the machine of this invention, including the means to accomplish the replacement for replenishment to provide instant mixing of the added ingredients with the liquid toner.

Other and more specific objects of this invention will become more fully apparent from the following description and appended claims as illustrated by the drawings in which FIG. 1 is a perspective view of the electrostatic printer showing exposure window and copy sheet magazine covers raised;

Figures 22, 23, 24, 25, 26, 27, 27A:
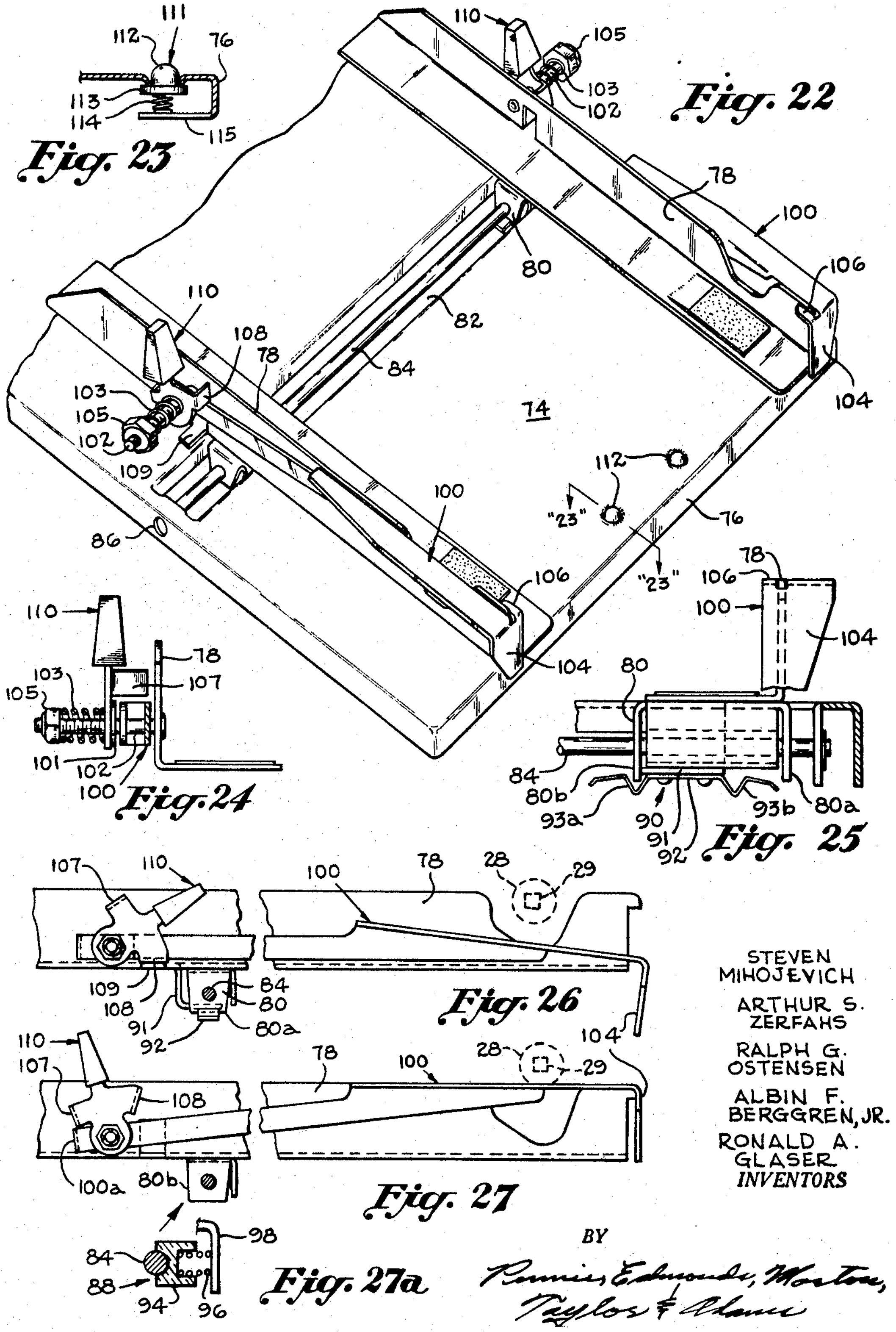
FIG. 22 is a perspective view of the paper magazine tray.
FIG. 23 is an enlarged fragmentary cutaway view showing the mounting of the support buttons in the magazine tray.
FIG. 24 is an enlarged fragmentary side view of the handle showing its mounting to the side rail.
FIG. 25 is an enlarged, partially cutaway sectional view of the retention mechanism beneath the right hand side rail of FIG. 22.
FIG. 26 is a partially sectioned side view of the right hand side rail and bail in FIG. 22 showing the handle in its arm lowering position.
FIG. 27 is a partially sectioned side view of the left hand side rail of FIG. 22 showing the handle in its arm raising position.

FIG. 27*a* is an enlarged view of the friction brake mechanism which is located beneath the left hand side rail in FIG. 22.

Figure 28:
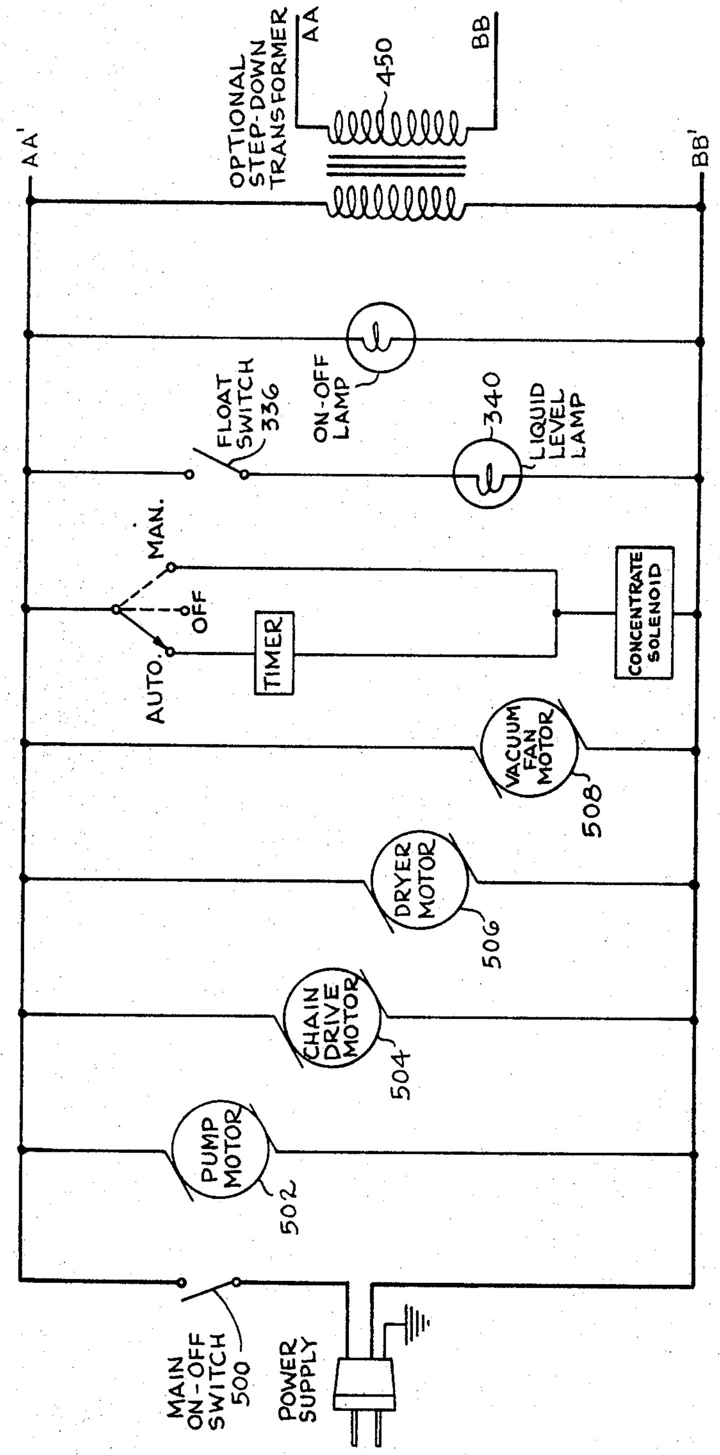
Figure 29:
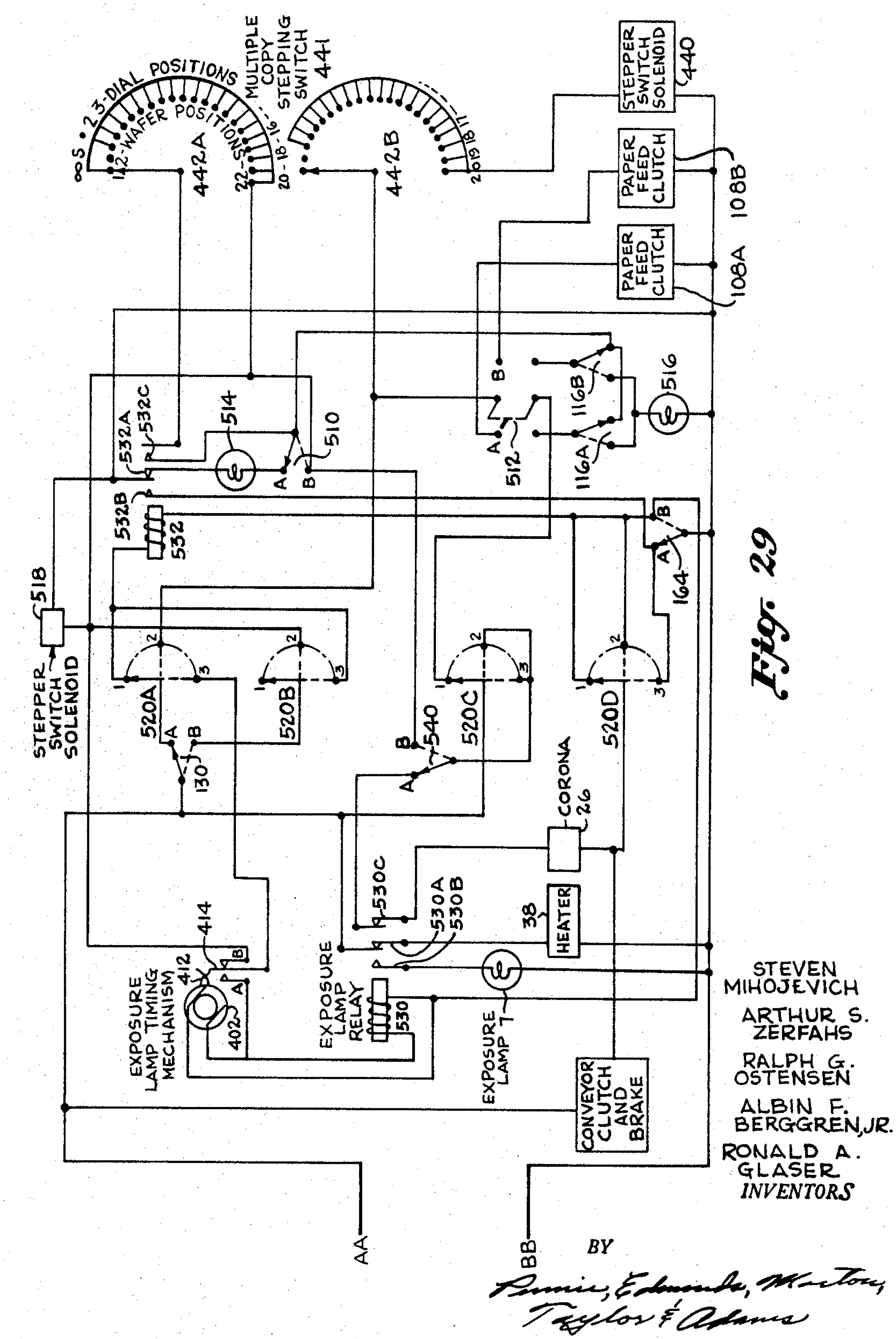

FIG. 28 is a partial schematic wiring diagram of the electrical components of the printer ordinarily operable on 110 volts but which can be altered for 220 volt operation;

FIG. 29 is a schematic wiring diagram showing the remainder of the electrical circuitry in the printer and more particularly showing that portion which is operable on 110 volts but usable with a 220 volt or other power supply.

*Summary description*

Figure 6:
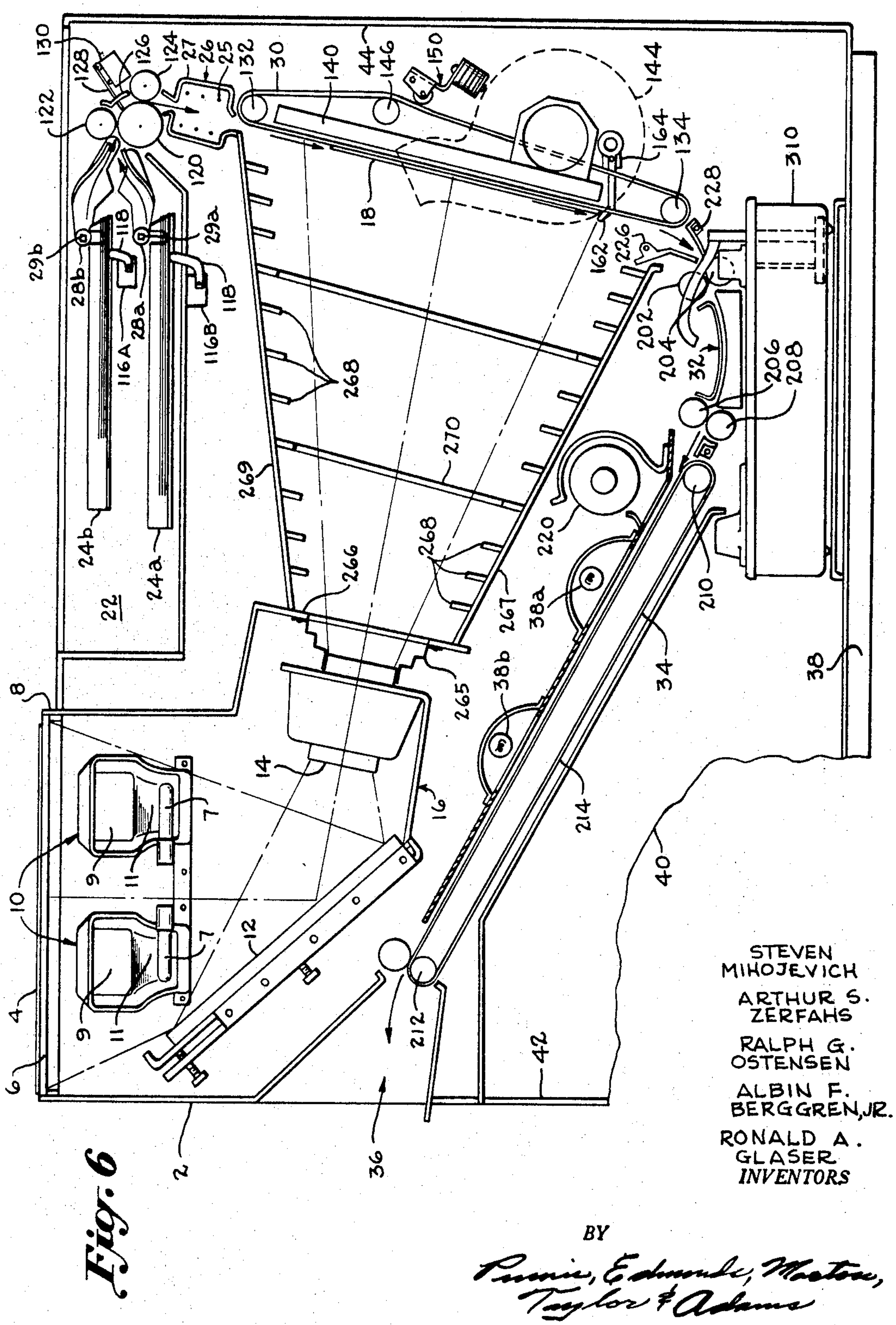
FIG. 6 is a sectional view of the printer shown in FIG. 1 substantially along lines 6—6.

Referring now to FIGURE 6, the electrostatic printing machine of the present invention functions as follows:

A document 4 is placed on a window 6 covered with a transparent material such as glass which forms the top wall of a raised box-like portion 8 located on the topside of machine housing 2.

The window 6 and document 4 thereon are illuminated by reflector lamp assemblies 10 which are mounted in pairs on the side walls of the housing adjacent portion 8.

The illuminated image of document 4 is reflected by an adjustable mirror 12 into a lens 14. Mirror 12 and lens 14 are mounted on a frame 16 which is in turn adjustably carried by the housing 2. The image is projected by lens 14 onto an electrostatically charged sheet of photoconductive copy paper 18, held to vacuum platen 140. As the image strikes the copy paper, the charge on the latter is reduced by an amount corresponding to the intensity of the image. Dark portions of the image affect the copy paper while light areas of the reflected image may have sufficient light intensity as to almost completely release the latent electrostatic charge on the paper.

The copy paper is stored in a paper supply compartment 22 containing two paper feed trays **24*a* and 24*b***. The paper feed trays are constructed to receive varying widths and lengths of copy paper, allowing the operator the flexibility of choosing from one of two sizes stored in the magazine—as for example 8½" by 11" sheets in one tray and 8" by 14" in the other.

The copy paper is fed to a corona charging unit 26 by either feed roller **28*a* or 28*b* depending upon which feed tray has been selected for use by the operator. The actual selection of the feed tray is accomplished by the actuation of a selector switch which feeds power to one or the other of the drive mechanism powering feed rollers 28*a* and 28*b*. Corona unit 26** imparts an electrostatic charge to the photo-sensitive surface of the copy paper of approximately 400 volts.

After passing through corona unit 26, the copy paper is transported by perforated conveyor belts 30 over vacuum platen 140 to a predetermined point. At this predetermined point the conveyor belts are stopped and the image, previously alluded to, is projected onto the copy paper.

The reflector lamp assemblies illuminate the glass window 6 on a timed basis. At the end of the timing period the conveyor belts are reactivated, causing the copy paper to pass between pivoting guides 226 and 228 into a developer station 32 via rollers 202 and 204. The developer station 32 may be of any well known type, but in this instance the paper passes through a pool of liquid developer containing positively charged particles which are attracted to the charged portions of the paper to develop the latent electrostatic image which has been placed thereon.

Figure 1:
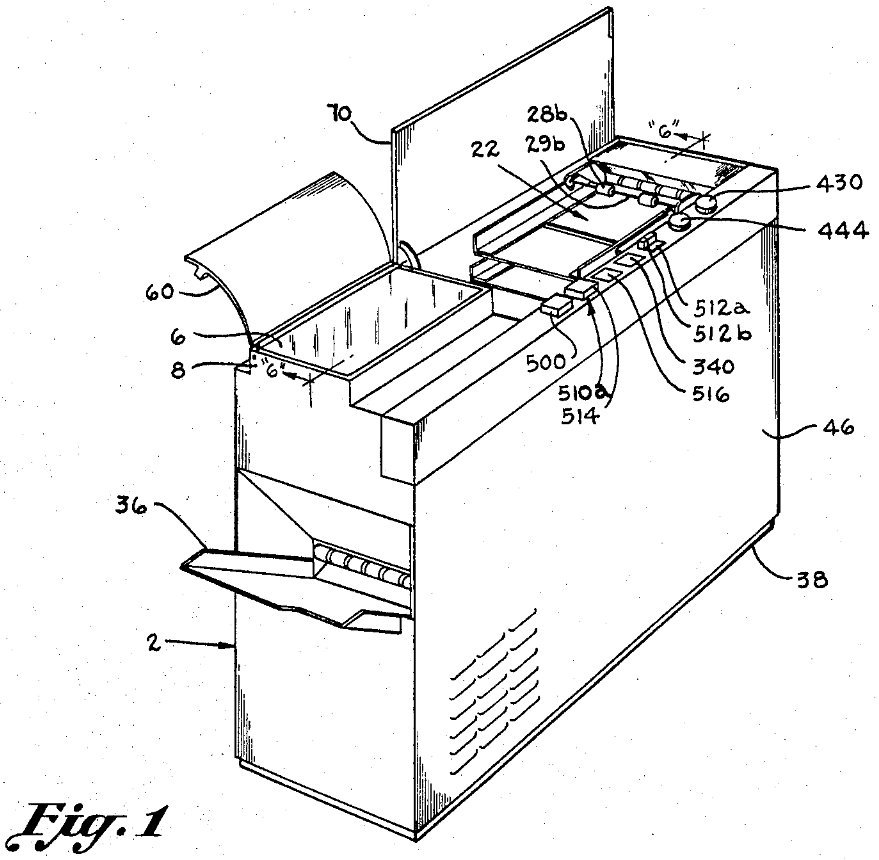

After passing through the developer station the copy paper is carried by a conveyor belt 34 beneath heat lamps 38a and 38b which remove any excess moisture from the copy paper, and to an exit tray 36 (FIG. 1).

*Detailed description*

As is best seen in FIGURES 1 and 6, housing 2 has a base 38, a pair of supporting side walls 40 extending upwardly from the base, a front wall 42, and a rear wall 44. Housing 2, as shown in FIG. 1 may be provided with removable side panels 46, which shield the functional side walls 40 for ornamental purposes.

Figure 2:
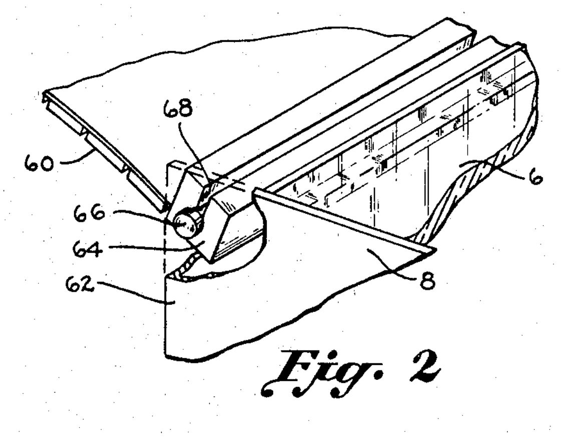
FIG. 2 is an enlarged fragmentary view of the exposure window cover mounting mechanism.

The top side of housing 2 has raised box-like portion 8 having a window 6 covered by a transparent material such as glass. Flexible cover member 60 formed of an opaque material is hinged to box 8 and acts as a protective cover for window 6 when the machine is not in use, and also may be used to retain a document on the window 6. When a large document surface is placed against window 6, however, it is advantageous to fold back cover 60 to a fully open position. To insure a completely flat contact between a large document surface and window 6, the hinging arrangement shown in FIG. 2 is utilized. A side portion of box 8 is notched along most of its length, and a rod 66 fastened at both ends to box 8 is carried in this notch. Cover member 60 has a reinforced portion 64 having a molded groove 68 running its entire length. Cover 60 is mounted onto box 8 by forcing rod 66 into groove 68. By positioning rod 66 a spaced distance below the plane of the top window surface 6, cover 60 when folded open will be entirely below said window surface plane, thus removing one cause of possible aberration in the optical system of the machine.

*Paper feed mechanism*

A hinged door 70 in the topside of housing 2 as shown in FIG. 1 covers a copy sheet supply compartment 22, wherein copy sheets having a photoconductive zinc oxide layer thereon may be stored for use in the machine. Compartment 22 houses a pair of removable paper supply trays 24a and 24b which may be of identical construction as shown in FIGS. 22 to 27. Trays 24a and 24b comprise flat sheet metal plate members 74 having turned down lips 76. The trays are mounted one above the other in the supply compartment by suitable brackets (not shown) to allow easy removal for loading purposes. In this connection, it should be observed that the lower tray may be mounted to the brackets in a more permanent manner, as only the top tray is removed in the paper loading operation so as to permit access to the lower tray.

As shown in FIG. 22 plate member 74 has a pair of upright paper guides 78 slidably mounted thereon to accommodate different widths of paper.

Each guide 78 basically comprises a piece of angle stock having a depending U-shaped foot 80 fastened to the underside edge. Foot 80 protrudes through a cutaway portion or slot 82 which extends substantially across the entire width of plate 74. A rod 84, carried by two tabs (not shown) is inserted through a hole 86 and is positioned centrally in slot 82 below the level of plate 74. Foot ends 80a and 80b each have a hole therein through which rod 84 is positioned so as to slidingly hold foot 80 to the rod.

As best seen in FIGS. 27 and 27a a friction brake 88 is also provided to inhibit but not prevent sliding movement of guide 78.

Brake 88 comprises a shoe 94 having a rounded slot for engagement with rod 84 and a spring 96 which is carried between shoe 94 and a lip 98 on foot 80. Spring 96 then urges shoe 94 against the rod providing the desired braking.

Although both guides can be constructed as described, the preferred embodiment adds a retention mechanism 90 to one guide so as to releasably fix it in one of two given positions with respect to the optical system in the machine so as to provide proper registration between the side edge of a document and its projected image on the copy paper respectively as will presently be described. As best seen in FIGS. 25 and 26, an angle bracket 91 has two notches 93a and 93b which alternately engage one or the other foot ends 80a to 80b. Spring notches 93a and 93b hold the guide 78 fairly immobile in either position yet do allow the guide to be moved to the other position by exerting sufficient force. The bracket 91, however acts as a stop to prevent the guide from moving any further in either direction.

Thus the guide 78 in FIG. 25 is set in a first position for ordinary copy sheets, and then adjusted to a second position when running "paper master" copy sheets (utilized in offset printing) where a wider margin is desirable. In either of the two positions a stack of copy sheets may be placed against the guide and the opposite guide not so retained may be slidably adjusted to engage the opposite edge of the stack, regardless of the copy sheet width. In the preferred embodiment this adjustment is limited to a minimum proper width of 3" and a maximum of 10" for practical purposes.

Each guide 78 carries an arm 100 pivotally mounted to the guide 78 on a shaft 102. A snap ring 101 on shaft 102 retains the arm to the shaft 102 without impairing pivotal movement thereon. Arm 100 is formed with a turned-down front portion 104 which extends downwardly from the arm to slightly overhang the front of plate member 74 and guide 78 so as to act as a front stop for the paper stack as it is loaded into the tray.

Adjacent portion 104 on arm 100 is a finger member 106 positioned to overlie the corner edge of the paper stack. Finger members 106 assist the feed rollers 28 in guiding a sheet of paper into the feed system without accidentally carrying the underlying sheets with it.

Obviously, with finger member 106 resting on the paper stack in normal operation, the arm must be raised slightly when a fresh stack of paper is placed in the tray. This can be manually accomplished by grasping the arm and raising it. Each shaft 102 also carries a handle 110 which acts to releasably hold arm 100 in an upright position during loading in a manner which will now be described.

Handle 110 is rotatably carried on shaft 102 but as shown in FIG. 24 its rotation is inhibited by a spring 103 which bears on a retaining nut 105 attached to the end of shaft 102. Spring 103 then urges the leg portion of handle 110 against retaining ring 101. Any rotation of handle 110 must be against the frictional drag developed between the handle 110 and the retaining ring.

Handle 110 is formed with projecting lugs 107 and 108 which act as stops to limit the rotation of the handle 110. As best seen in FIG. 26 lug 108 engages an ear 109 or guide 78 when handle 110 is rotated clockwise toward the front of tray 74.

When the handle 110 is rotated counter-clockwise as shown in FIG. 27 lug 107 engages a rearward projection 100a of arm 100 and further rotation pivots the front of the arm, including front portion 107, upwardly. Spring 103, as previously described, acts to inhibit rotation of the handle 110, therefore the arm 100 remains in an upward position. When both arms have been so raised a new supply of copy sheets may be placed in the tray and the arms lowered again by rotating the handle 110 forward again as shown in FIG. 26.

Due to the thickness of the bottom portion of the guide members, the center of the paper stack may tend to bow somewhat, causing feeding problems. As can be seen in FIGS. 22 and 23 buttons 111 protruding through openings in plate 74 are spring biased to lightly engage the underside of the paper stack to inhibit such bowing.

A collar or shoulder 113 formed on button 111 below a hemispherical surface 112 is of a larger diameter than the opening in plate 74 so as to engage the underside of the plate and act as a stop for the upward movement of the button. A spring 114 resting on a flange 115 formed on the side of lip 76 biases the button upwardly toward the stop position.

The hemispherical surface 112 acts as a cam to urge the button 111 below the surface of the plate against the spring bias when the guide 78 passes over the button 111. Thus, freedom of adjustment of the guides is not sacrificed by the presence of the buttons.

Returning now to feed rollers 28*a* and 28*b*, square drive shafts 29*a* and 29*b* are employed to respectively mount the rollers 28*a* and 28*b* for rotational motion yet allowing lateral adjustment of the rollers 28*a* and 28*b* on the shafts. Rollers 28*a* and 28*b* may be spring loaded to the shaft to prevent unwanted sliding. A suitable drive mechanism can be employed to impart rotation to the shaft such as that described in U.S. application, S.N. 248,249. In the present invention, two such drive mechanisms are used (one for each tray). Additionally, in each tray a feeler arm 118 (FIG. 6) operationally attached to switches 116A or 116B is provided to sense depletion of the paper stack. Actuation of switch 116A or 116B upon depletion of the paper causes a visible signal to appear in indicator lamp 516 of "Add Paper" or the like. Additionally through circuitry which will be described hereafter, the particular drive mechanism becomes disabled until the paper supply is replenished.

As in application S.N. 248,249 referred to, an electromagnetic clutch is driven through a gear and chain drive which likewise powers the other elements in the feed train to be described. It should be understood that the aforesaid drive mechanism, which performs a critical synchronization function when image projection is done with both document and copy paper moving, is not as critical in this invention because the image projection is done when both subject matter and copy paper are in non-moving positions.

The copy paper, fed by either feed rollers 28*a* or 28*b*, is urged toward a throat formed by rollers 120 and 122. Roller 120 has a fairly large diameter and therefore can function also as a guide for changing the direction of the paper travel. This is accomplished in cooperation with a curved guide 126 which is located immediately beyond roller 122. Guide 126 is shaped to approximately the same radius of curvature as roller 120 to allow smooth transit of the paper therebetween.

The throat or bite of rollers 120 and 122 is vertically positioned so as to operate equally well with copy paper fed to it from either tray. In this connection also, the large diameter of roller 120 is of assistance.

Immediately adjacent guide 126, roller 124 is positioned to receive the copy paper and in cooperation with roller 120, urge the paper toward the corona charging station 26.

As the paper passes between guide 126 and roller 120, a trip lever 128 is engaged by the paper edge, which in turn, operates a switch 130. Switch 130, among other things, actuates circuitry to turn on the corona charging unit 26.

Corona charging unit 26 as best seen in Fig. 6 comprises a pair of rectangular shields 27 each housing a set of very small diameter corona wires 25, so named because of the corona discharge created when a voltage in the order of four to eight kilovolts is applied to them. For a more complete description of the construction and operation of such a unit attention is again invited to application S.N. 248,249. The copy sheet passes between the sets of wires and its photosensitive surface becomes negatively charged by the corona ion cloud therein.

*Vacuum conveyor system*

Figure 3:
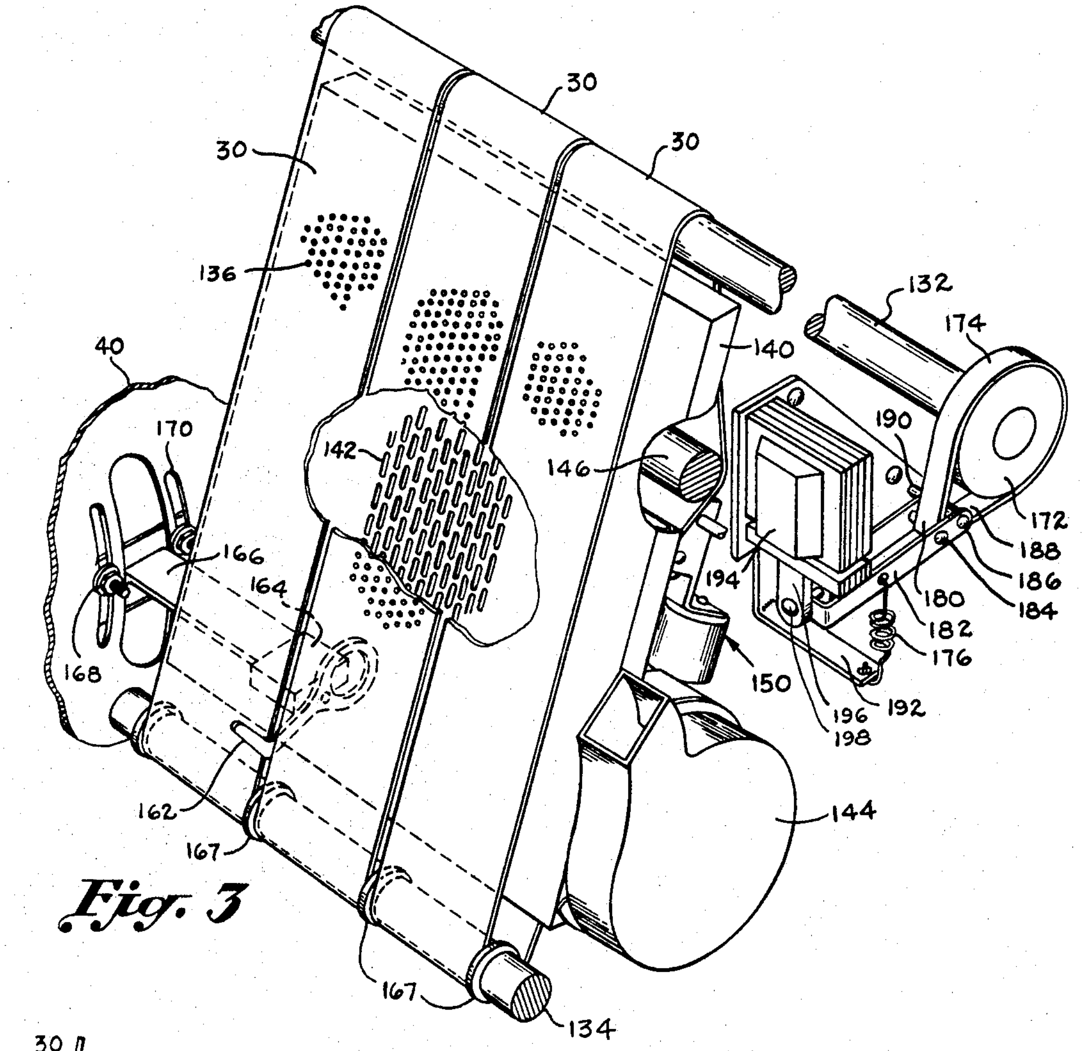
FIG. 3 is an enlarged and partially cut away perspective view of the vacuum conveyor belt assembly including the braking mechanism utilized in stopping the conveyor.
Figure 4:
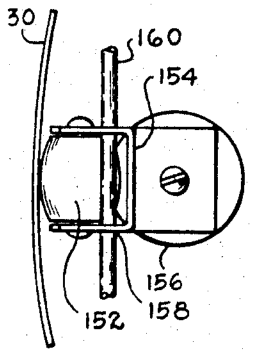
FIG. 4 is a top view of the belt tensioning roller and counterweight.
Figure 5:
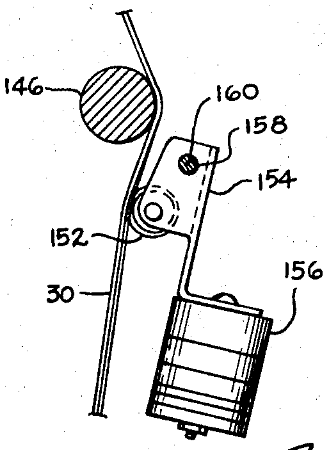
FIG. 5 is a side view of the belt tensioning roller and counterweight.

After passing through the corona charging unit 26, the copy sheet is picked up and transported by perforated conveyor belts 30. Referring to FIGS. 3–5, it will be seen that three such belts are carried side by side between top roller 132 and bottom roller 134. The belts may be constructed of Mylar or similar material, the main requirements being flexibility and strength. As can be seen in FIG. 3, the belts are perforated by many small, closely spaced holes 136 to allow air to pass therethrough.

Between the two portions of the belt loops, a rectangular vacuum platen or chamber 140 having a series of oval openings 142 on its front surface, cooperates with the perforations 136 in the belts 30. Platen 140 is formed as a shallow box having an exhaust or vacuum fan 144 connected thereto.

Air is drawn in through the belt holes 136, the platen openings 142, and travels through the platen 140 to fan 144. Appropriate baffling (not shown) within the platen 140 insures an even flow of air through all the openings.

The copy sheet, upon reaching the belts 30, is drawn and held to the belts 30 by the pressure differential developed across the belt 30 as the air is pulled into the platen 140 through the perforated openings.

Returning now to the mounting of the belts 30, a tensioning roller system 150 is located behind the platen 140, acting to provide tension on the belts 30 and to aid in proper tracking of the belts 30 and to prevent lateral wander. This is of particular importance in the machine of this invention because any lateral travel of the belts could also shift the copy sheet, causing misregistration as the image of the document is projected thereupon.

An idler roller 146 is therefore provided which extends through the belts' loops bowing them outwardly. Roller 146 is carried by sidewalls 40 of housing 2 in similar fashion to rollers 132 and 134. Counterweighted rollers 152 are provided for each belt 30, and as best seen in FIG. 4 engages the center of each belt 30. The axial roundedness of roller 152, together with its central engagement of the belt 30 causes a lateral bowing of the belt 30 which, it has been found, acts to prevent lateral wander of the belt 30. In this connection it should be noted that upper roller 132 can also be provided with rounded or crowned portions to centrally engage each belt if necessary.

Weighted roller 152 is carried by a bracket 154, which has attached thereto at its opposite extremity a weight 156 which comprises a group of weights having various masses. Bracket 154 is in turn pivotally attached at 158 to rod 160, which is horizontally carried between sidewalls 40. Each belt 30 is provided with such a weighted roller assembly and the weight on each can be adjusted by varying the number of weights used for maximum results.

In addition to the tracking or "anti-wander" effect of the weighted roller 152, circular separators or spacers 167 are provided between the belts 30 and secured in any suitable manner on bottom roller 134 of the conveyor belt assembly. Spacers 167 are of a diameter to protrude beyond the belts 30 and thereby provide rounded protrusions at the bottom of the conveyor belt assembly which perform a primary function as copy sheet removal members. Thus the moving copy sheet upon reaching the separators is carried away from the belts and the pressure differential effects of the perforations therein.

Still referring to FIG. 3, a trip lever 162 is shown projecting between the belts 30 at a point below the bottom of the platen 140 and is attached to an electrical switch mechanism 164. When a copy sheet traveling with the belts 30 reaches this point, lever 162 is carried by the sheet to a switch tripping position (not shown). At this point, switch 164 is actuated, causing, through an electrical circuit which will be later described, the conveyor belts to stop. The alluded to circuitry controls an electromagnetic clutch (not shown) which provides driving power to upper roller 132 from the gear and chain drive mechanism of application S.N. 248,249 previously referred to. Thus, engagement of the trip lever deactivates the drive train to the conveyor. In this connection, still referring to FIG. 3, it should be noted that switch mechanism 164 is mounted to an adjustable bracket 166 which is in turn mounted to sidewall 40 by bolts 168 carried in slots 170 in the sidewall. The bracket 166, switch 164 and lever 162 can thus be vertically adjusted so as to engage the copy sheet at different points. The adjustment, which need only be made upon initial construction, serves to locate the bottom edge of the copy sheet with respect to the projected image. This relationship can be readily appreciated by referring to the projected images shown in FIGURE 20. The front edge 200*a* of the exposure window 6 and document 4 thereon becomes, due to the optical system, edge 200*b* of the projected image on the copy sheet. If the sheet has progressed beyond this point, the projected image will be spaced from the edge of the copy sheet. If the document and copy sheet are of identical size, the opposite edge of the document will be projected beyond the corresponding opopsite edge of the copy sheet. The registration between document and copy sheet thus plays an important role in proper performance.

In this same connection it should be noted that the side edge 201*a* of exposure window 6 and document 4 are projected onto the copy sheet at 201*b* due to the optical reversal. Positioning of the copy sheet at 201*b* is accomplished by proper setting of the side rail 100 or guide retention mechanism previously described.

While the initial adjustment of the position of trip lever 162 to a large extent controls the vertical registration, there still exists the possibility of slight overrun due to the momentum of the rollers and belts. For this reason, an additional registration safeguard is built into the system in the form of a brake mechanism.

Referring again to FIG. 3, it will be seen that upper roller 132 carries a large disc 172 on one end. A brake band 174, wrapped around the disc has a first end 180 attached to a lever 182 by pin 184. Lever 182 in turn is pivotally attached to sidewall 40 by a pin 186 at 190. The other end of the brake band 188 is likewise attached to sidewall 40 by pin 186. A spring 176, attached to lever 182 and to a bracket 192 mounted to sidewall 40, urges lever 182 downward, carrying brake band end 180 with lever, to effect a braking action against the periphery of disc 172. The normal position of the mechanism is therefore in a braking position.

To release the brake mechanism described, a solenoid 194, mounted to sidewall 40 adjacent bracket 192, has a plunger 196 attached to the end of lever 182 at pivot point 198.

Under normal conditions, the spring 176 pulling lever 182 downwardly also carries plunger 196 with it. When solenoid 194 is activated, the plunger and lever are raised, overcoming the spring 176 and causing the brake band 174 to release.

The activation of solenoid 194 is accomplished simultaneously with energization of the electromagnetic clutch on the conveyor belt by electrically wiring the solenoid and clutch in parallel. Thus, the copy sheet in tripping lever 162 not only shuts off the driving means for the conveyor belt, but causes the belt to instantly stop by application of the brake mechanism 174 to roller 132.

The copy sheet, after contacting lever 162, is held to the belts 30 in a stationary position. The image of the document to be copied is then projected onto the copy sheet for a fixed increment of time sufficient to selectively discharge the areas of the copy sheet corresponding to the lighter areas of the document, leaving a charge pattern on the photoconductive surface of the copy sheet as is well known in the field of electrophotography.

After the image exposure period, the conveyor belts 30 are reactivated and the brake 174 released, allowing the copy sheet to pass beyond the trip lever 162 and be engaged by the spacers 167. As previously described, the spacers 167 now assist in removing the sheet from the influence of the pressure differential of the perforated belts 30 and vacuum platen 140.

The copy sheet next passes to the developer station 32 (FIGS. 6 and 11) which comprises a pair of entrance rollers 202 and 204. Upper roller 202 may be a steel roller carried by the sidewalls 40 through insulated bearings. Lower roller 204 may have a rubber surface to provide good frictional contact with the copy sheet for driving purposes.

Beyond the entrance rollers in the developer station, the copy sheet passes through a pool of liquid developer containing positively charged colored particles which are attracted to the remaining negatively charged portions of the copy sheet corresponding to the dark portions of the image which has been projected thereon.

After passing through the pool of liquid developer, the copy sheet is engaged by a second set of rollers 206 and 208 which not only serve to propel the developed copy sheet onward in the feed train, but also perform a wringer or squeegee function. The copy sheet, as it emerges from the pool of liquid developer, has a film of liquid adhering to its surface. Since it is desirous to have a dry copy sheet as the final product of the machine, this wet film must be removed. Rollers 206 and 208 serve to remove most of this liquid film.

As with entrance rollers 202 and 204, the exit rollers may comprise an upper steel roller 206 and a lower rubber roller 208. In the preferred embodiment, the upper steel roller 206 is electrically grounded to the housing while the lower roller 208 is insulated therefrom by insulated bearings. Both rollers 206 and 208 are carried by the sidewalls 40 in similar fashion to rollers 202 and 204.

After passing through exit rollers 206 and 208, the carrier sheet is picked up by a conveyor belt 34 and delivered to exit tray 36. Conveyor belt 34 comprises a pair of rollers 210 and 212 journaled in appropriate bearings in sidewalls 40 and having a series of spaced apart cords or bands 214 which can be of an elastic type material. The conveyor belt 34 is powered through an appropriate spur gear (not shown) to the drive chain previously referred to.

Positioned above the conveyor 34 are a pair of heat lamps 38*a* and 38*b*. Any moisture remaining on the copy sheet is removed by the heat lamps, in conjunction with a fan 220 which circulates the warm air above and beneath the copy sheet between the spaced apart cords.

*Optical system*

Figure 20:
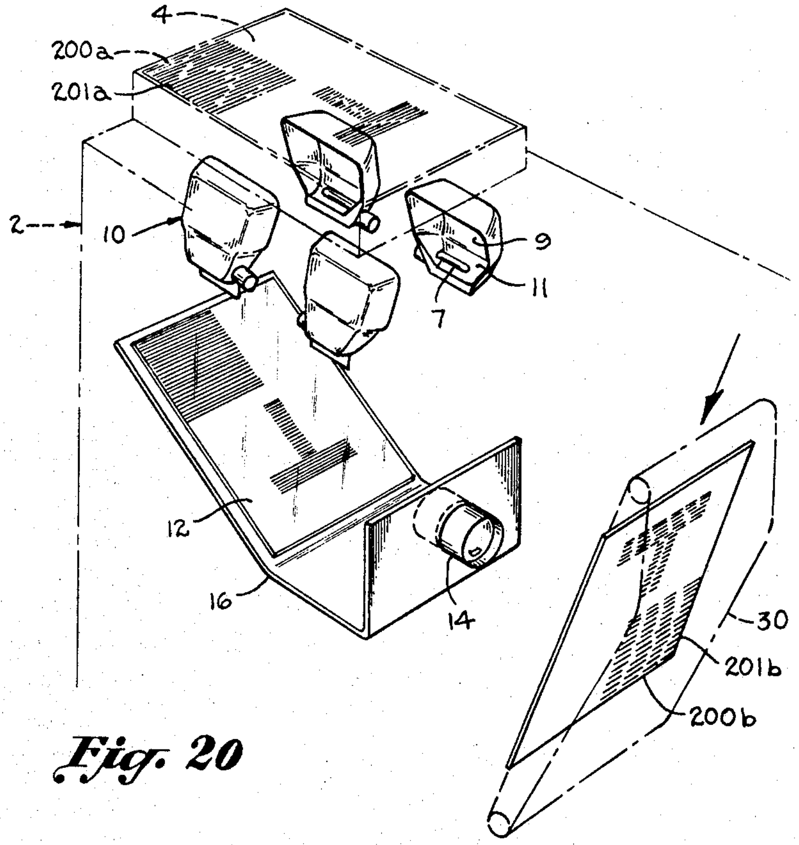
FIG. 20 is a fragmentary view in perspective showing relative position of an image as it is projected through the optical system.
Figure 21:
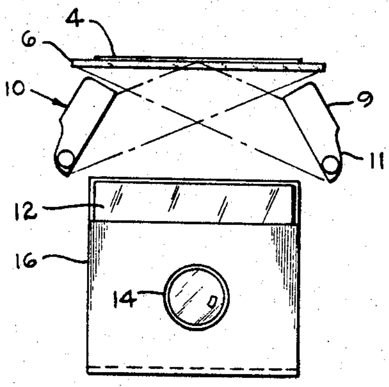
FIG. 21 is a fragmentary end view showing the position of the reflector lamp assemblies with respect to the exposure window and mirror.

Referring now to FIGS. 20 and 21 the projection path of the document image from the window 6 to its final destination on the copy sheet can be readily traced out.

As previously described, a document to be copied is placed against the window 6 and the under surface of the document which faces the window is illuminated by reflector-lamp assemblies 10. Four such assemblies are mounted in pairs to the sidewalls 40 as shown in FIG. 20 and so positioned as to uniformly illuminate the entire window 6. As best seen in FIG. 21 each pair of assemblies is mounted at such an angle that the reflector acts as a shield at 9 and a reflector at 11 to shine on the opposite portion of the window, as shown in the dotted lines. This also serves to protect the eyes of an operator inadvertently placing a document on the window while the lamps are shining.

As previously mentioned the lamps 7 are of the incandescent variety having a tungsten filament within a quartz envelope in which a small amount of iodine gas has been liberated to enhance the life of the filament and prevent deposition on the walls of the envelopes which would reduce the intensity of the light. Such a lamp is now available from several commercial sources and is usually termed an iodine quartz lamp.

The exact position of each reflector lamp assemblies can be varied somewhat depending upon the illumination requirements and the relative positions of the other optical path members. This can be accomplished either by moving the reflector 12 itself relative to the sidewall 40 or by shifting the lamp 7 mounted within the reflector 11. Fairly uniform illumination of the window 6 must be obtained for satisfactory results.

The illuminated image of the document surface is reflected in an adjustable mirror 12, which redirects the path of the light toward a lens 14, which in turn projects the image onto the copy sheet. The relative positions of these optical members can be best visualized by inspection of FIGS. 12 and 20.

Figure 16:
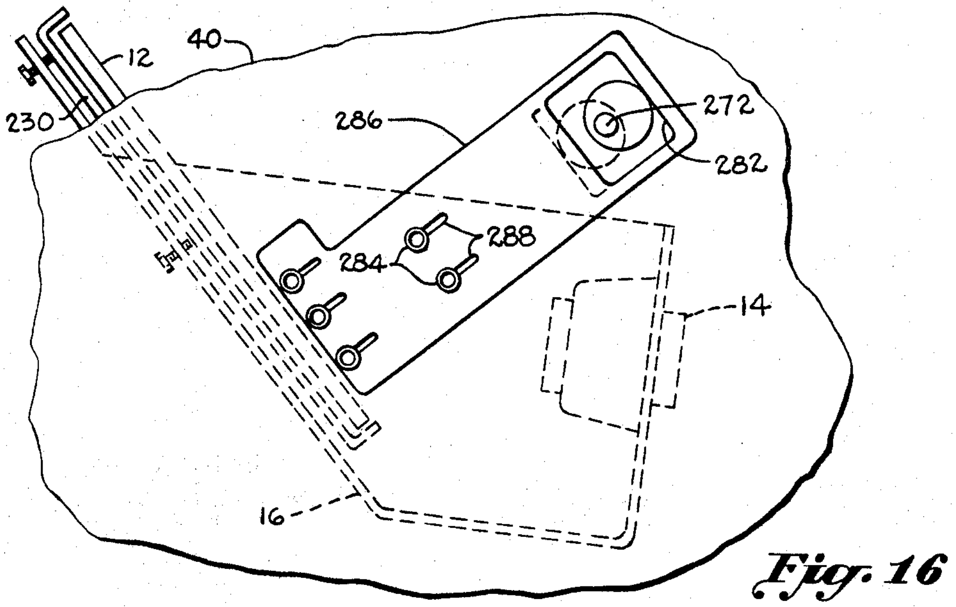
FIG. 16 is a partially cutaway side elevation of the optical mounting bracket showing the details of its adjustment relative to the frame of the printer.

Mirror 12 is carried by mounting plate 230 adjustably attached to a frame 15 (see FIG. 16), which is mounted to sidewall 40 by a series of bolts 284, which pass through slots 288 in side portions 286 of frame 16.

Referring now to FIGS. 12–15, plate 230 is pivotally mounted to frame 16 by a central pin at 232 having a beveled head which engages a cupped shaped bushing on plate 230. Any pivotal construction such as is well known in the art, as for example that used on the rear-view mirror of an automobile, can be utilized in place of pin 232 in accordance with this invention.

The mirror mounting as described to this point would be completely adjustable, but susceptible to being jarred out of adjustment after initial setting. Since the purpose of the mirror is to change the path of light image and direct it into the lens, such adjustment must be precise and not subject to change by jarring or moving of the machine. An adjustment and retaining mechanism is therefore provided wherein a biasing force is applied to one corner of the mounting plate and a pair of set screws opposes this biasing force. The biasing force is applied by a spring 236 interposed between the underside of frame 16 and a shoulder 240 on a pin 238 which is threadedly secured to plate 230 and protrudes through an opening provided in frame 16. Spring 236 thus urges one corner of the mounting plate 230 toward the frame 16.

Figures 12, 13, 14, 15:
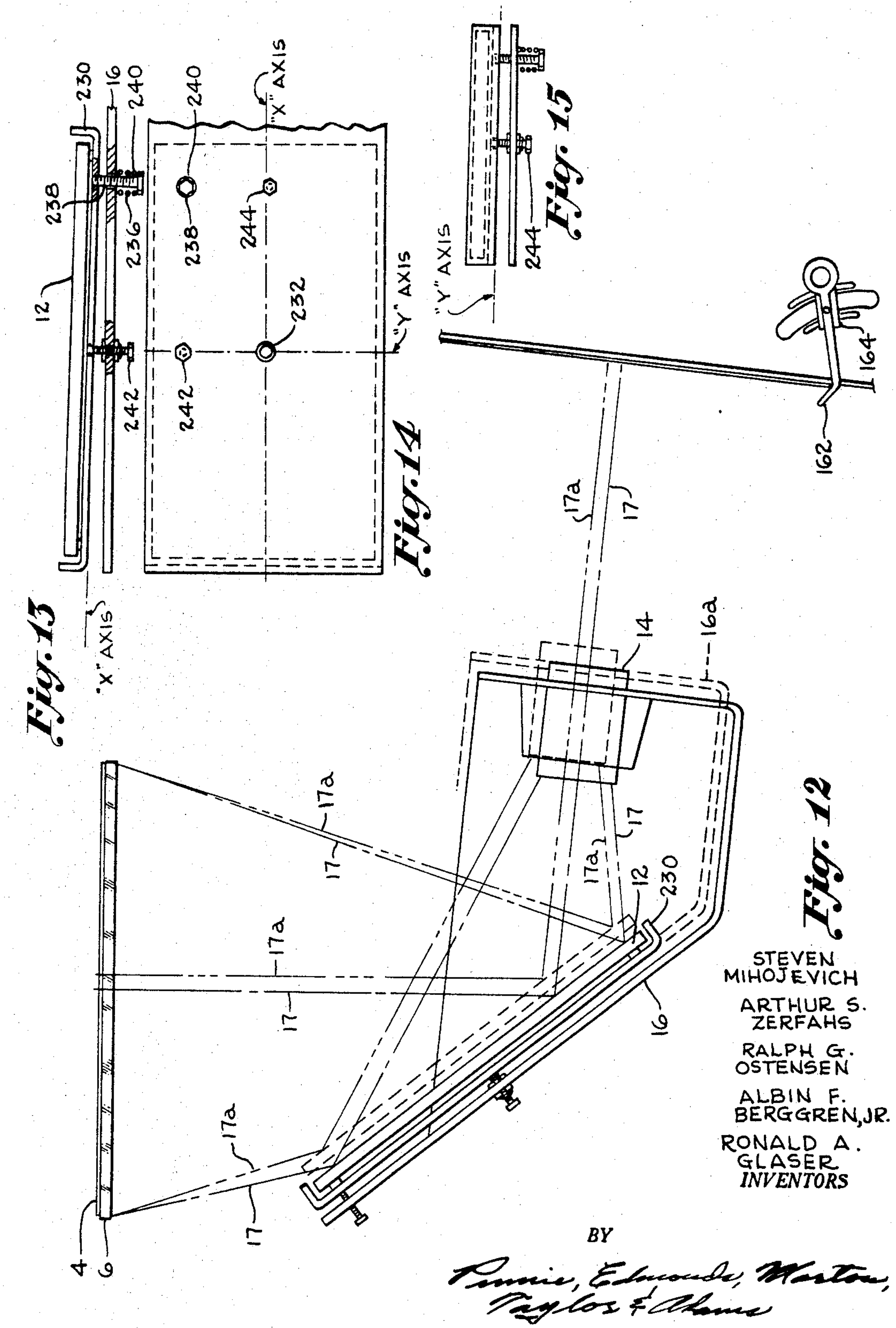
FIG. 12 is a sectional side view of the optical components with dotted lines representing various light paths when the components are adjusted.
FIG. 13 is a side elevation of the mirror mounting mechanism showing adjustment along the X axis of the mirror.
FIG. 14 is a bottom view of the mirror mounting plate showing the adjusting studs thereon.
FIG. 15 is an end elevation of the mirror mounting mechanism showing adjustment along the Y axis of the mirror.

Adjustment screws 242 and 244 are threaded through holes in frame 16 so as to bear against the underside of mounting plate 230. Referring to FIGS. 13–15, adjustment of the mirror is accomplished by alternately adjusting each screw while using the other screw and the central pivot as a pivotal axis against the pressure of the spring. Thus, in FIG. 13, screw 242 is turned to effect adjustment along the X axis of the mirror, while in FIG. 15, screw 244 acts to adjust the mirror along its Y axis of rotation. After final adjustments have been made, spring 236 acts to provide a constant tension on the other mounting members so as to prevent any vibrations or jarring from loosening either of the screws and to bias all play in either the threads of the screws or in the central pivot in a single direction so as to factor out misalignment from these sources.

Figure 18:
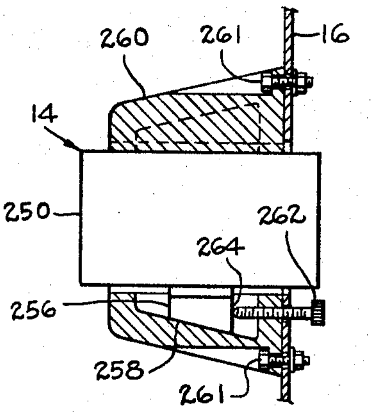
FIG. 18 is a cut away side elevation of the lens mounting plate.

Lens assembly 14 as shown in FIG. 18 is of substantially conventional construction comprising a tubular barrel 250 with a series of lenses (not shown) mounted therein. Barrel 250 is in turn adjustably mounted to a bracket 260 fastened to frame 16 by bolts 261.

Figure 17:
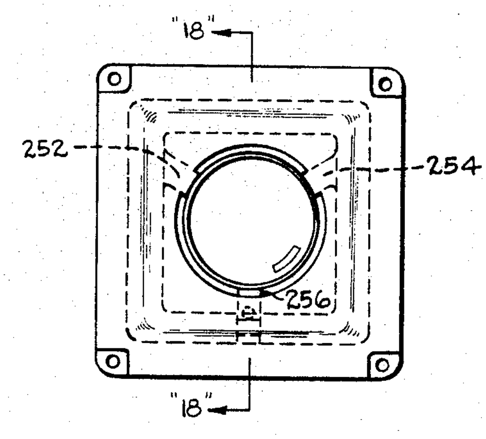
FIG. 17 is a frontal view of the lens mounting plate.

Bracket 260 is formed with a central opening as best seen in FIGS. 17 and 18. Protruding into the central opening are three rib-like members circularly spaced apart to engage the barrel 250 at approximately equidistant points. Rib members 252 and 254 are permanently formed with the bracket 260, while the third rib comprises a wedge-like member 256 carried in an inclined groove 258 transversally formed in the sidewall of bracket 260. A thumbscrew 262 threaded through frame 16 and bracket 260 bears against a shoulder 264 on wedge 256 forcing it inward. The inclined groove then cams the wedge 256 toward lens barrel 250 to secure it in place. Thus, rapid, yet secure, adjustment of the lens barrel 250 is assured.

The adjustment of the lens barrel 250 with relation to the other members of the optics system is necessary to obtain the proper size relationship between the document placed on the window 6 and the projected image reaching the copy sheet. Basically, this is accomplished by moving the lens toward or away from the mirror to equate the front rear focal length of the lens system.

Figure 19:
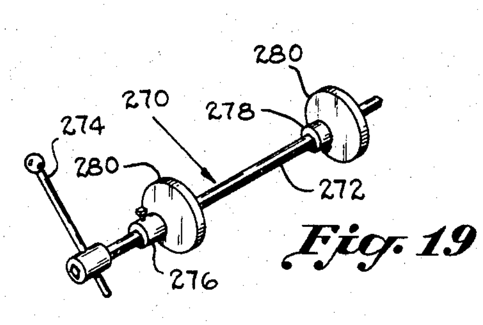
FIG. 19 is a perspective view showing the optical bracket adjustment tool.

One further adjustment in the optics system is necessary to properly focus the projected image onto the copy sheet. As previously described, frame 16 is adjustably attached to side walls 40 by the bolt and slot arrangement shown in FIG. 16. Adjustment of the frame moves the lens and mirror as a unit with relation to the window 6 and the vacuum platen 140. This adjustment has for its object the simultaneous and equal variance of the front and rear focal paths without disturbing the size relationship or the mirror alignment. To accomplish this, a special tool 270 shown in FIG. 19 is employed.

Tool 270 comprises a bar 272 having a handle 274. Identical collars 276 are positioned on the bar 272 in identical mating relationship. Collars 276 each have a concentric shoulder 278 and an eccentric shoulder 280. The bar and collars are mounted for adjustment purposes in holes in the sidewalls 40 corresponding to the diameters of shoulder 278 which accordingly acts as bearings for the rotation of bar 272. The eccentric portion 280 of collar 276 in turn engages an edge 282 of a cutaway section of side portion 286 and frame 16. With bolts 284 loosened slightly to permit movement portion 286 and frame 16, handle bar 272 is slowly rotated by handle 274. The eccentric shoulder 280, in cooperation with edge 282, then raises or lowers frame 16, depending upon the direction of rotation.

It should be noted here that the focusing must be accomplished by varying the front and rear focal lengths, that is the paths from window to mirror to lens and from lens to imaging station, an equal amount so as to not disturb the one to one size relationship. This can be appreciated by inspection of FIG. 12 where the lines 16 and dotted line **16*a* illustrate the optical system in two positions and the light paths 17 and 17*a*** correspond accordingly to both positions.

After the lens and mirror position is thus adjusted to obtain proper focusing bolts 84 are retightened and tool 270 removed.

Referring back to FIG. 6, it will be seen that lens assembly 14 projects the light image through a large housing or chamber and onto copy paper 18 held to platen 140. The platen forms the back wall of this chamber which is so constructed to be relatively light-tight to prevent discharge of the charged copy sheet by spurious light.

The light-tight chamber has a front wall 266 which interconnects with lens assembly 14 by means of a boot 265 of rubber or other flexible material allowing lens assembly 14 movement relative to wall 266. Front wall 266 is fastened to sidewalls 40 which form the sides of the light-tight chamber as well. A bottom wall 267 and top wall 269 which fan out from front wall 266 complete the enclosure. As additional protection against spurious light entering the chamber through the lens assembly from random angles a series of horizontal baffles 268 depend downwardly from top wall 269 and upwardly from bottom wall 267. Vertical baffles 270 carried by sidewalls 40 complete the baffling effect. The interior of the chamber including the baffling is then given a dull black finish so that spurious light entering the chamber at random angles will strike either a wall of the chamber or the baffles and then will not be reflected by the dull black finish onto the copy sheet.

*Development of latent image*

Figures 9, 10, 11:
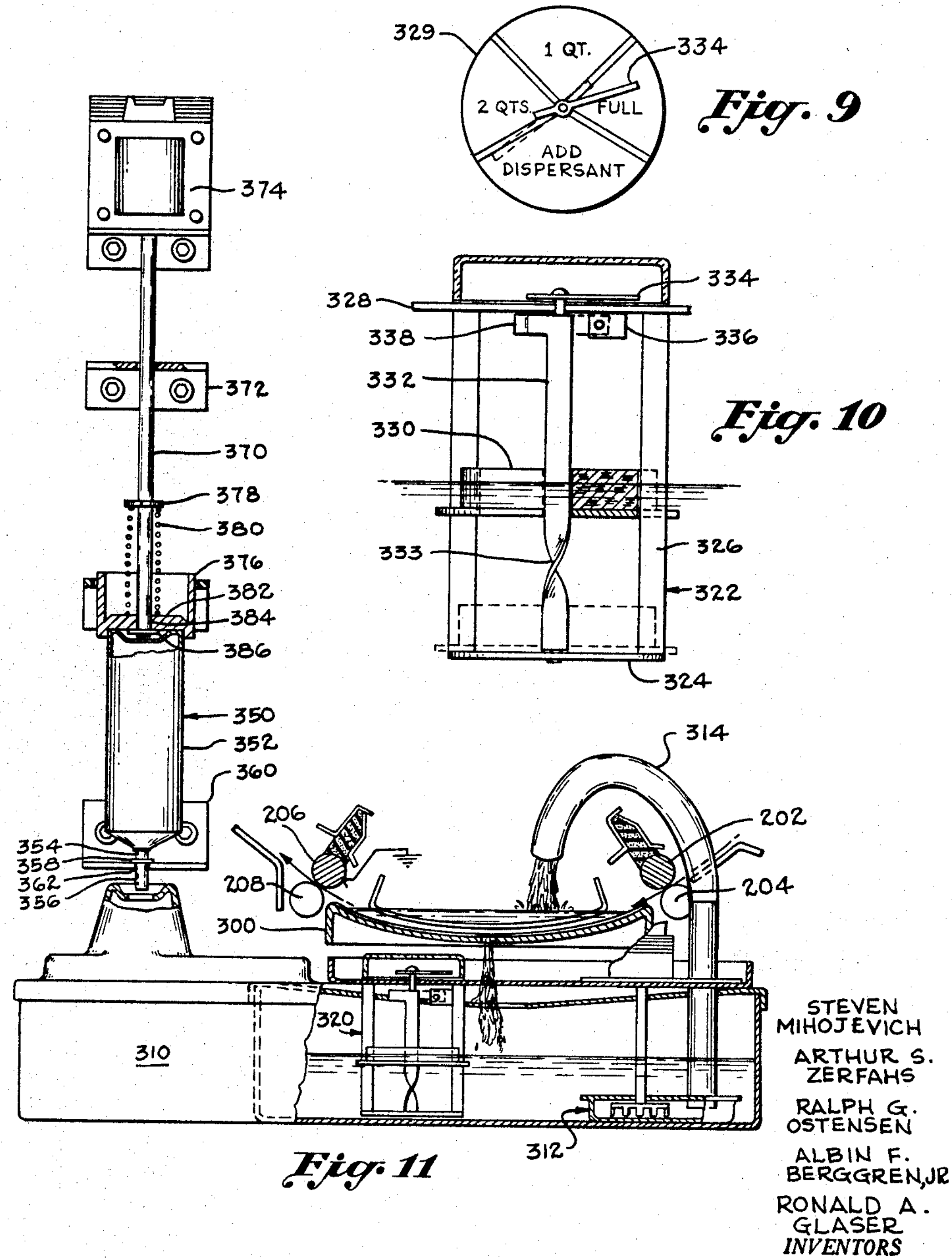
FIG. 9 is a top view of the liquid level indicating dial.
FIG. 10 is a side elevation of the liquid level float in the developer tank.
FIG. 11 is a partially cutaway side elevation of the developer tank with the liquid level float mounted therein and showing the aerosol replenisher container mounted above the developer tank.

As previously referred to, entrance rollers 202 and 204 urge a copy sheet carrying a charge image corresponding to the light image, projected by the optical system described, into a pool of liquid developer. Referring now to FIGS. 9, 10 and 11, the developer contacting the copy sheet is contained in a shallow tray 300 mounted atop a large tank 310. Tank 310 rests on the base 38 of housing 2, and contains a reservoir of liquid toner. A pump 312, having a tube 314 attached, circulates the toner fluid from the tank to the tray 300. The unused fluid pours over the edges of the tray and is returned to the tank. Other details of mechanical constructions may be examined in U.S. patent applications S.N. 143,086 and S.N. 270,289, reference to which is hereby incorporated.

The liquid toner used in the machine of this invention may comprise charged colored particles dispersed in a light hydrocarbon medium. The particular chemical composition of the toner forms no part of this invention, but some understanding of the complexity of the solution will aid in appreciation of the mechanism utilized in this invention to maintain a proper balance of chemical components in the toner.

In the liquid toner art certain basic problems relating to control of modification of the charge on the particles, adherence of the particles to the paper, settling of the particles while in the toner dispersion, drying of the adhering particles and the dispersion medium retained on the copy sheet have led to a variety of additives which severely complicate the maintenance of a balance of the ingredients of the toner since, obviously, certain components become depleted as copy sheets are run through the tray. The component which diminishes most rapidly is the light hydrocarbon medium (or dispersant) in which the other constituents are eventually dispersed in the tank. This may be remedied from time to time by addition of more dispersant.

Since depletion and addition of dispersant will change the ratio of the other components with respect to it, some indication of the toner liquid level is important.

Still referring to FIGS. 9, 10 and 11, a gauge 320 has been provided having a frame 322 which has a bottom plate 324, a pair of upright bars 326, and a top plate 328 having an indicating dial 329 on its top surface as shown in FIG. 9 is mounted in tank 310.

A float 330 is mounted to the gauge 320 and rides freely up and down confined only by bars 326 which cooperate with grooves (not shown) in the float 330 to prevent either lateral or rotational movement of the float 330. A central shaft or bar 332 journaled to both the top and bottom plates, and being formed with a torsional twist at 333, pierces the float 330 and vertically guides it in a non-rotational relationship. Movement of the float 330 up and down in cooperation with the torsional twist 333 on shaft 332 serves to impart rotational motion to the ends of the shaft. This motion is utilized at the top plate, to indicate the relative vertical displacement of the float, and thus the level of the liquid in the tank, by mounting an indicating arm 334 to shaft 332.

The indicating arm or pointer 334 acts in cooperation with the calibration on the dial face to readily reveal the level of the liquid. However, due to the positioning of the tank relative to the top surface of the machine, it has been found helpful to add an additional indicating means in the form of a light 340 on the top of the machine which is turned on by a switch 336 mounted to top plate 328 in a position to be actuated by a depending arm 338 mounted to rotate with arm 334 when the level of the liquid had dropped to a predetermined point.

As previously referred to, the charge colored particles and certain of the other additives used to increase the effectiveness of the particles must also be added periodically as copy sheets passing through the developer deplete the amount of such. To maintain a minimum amount of such particles and additives in the tank, a source of concentrated additive of such constituents 350 is strategically mounted above the tank. This allows periodic addition of incremental amounts of additive.

Referring to FIG. 11, source 350 comprises an aerosol container 352 containing a highly concentrated dispersion of particles and additives under pressure, as is common to the aerosol art. A metering valve (not shown) of conventional construction is carried within the container 352 adjacent an exit tube 354. A nozzle member 356 having a large shoulder 358 formed thereon is tightly fitted to the exit tube. The contents of the metering valve can be dispensed by depressing the exit tube toward and into the container utilizing the shoulder 358, as will be readily recognized as conventional by those skilled in the art. The actual amount dispensed can be varied by selecting various sizes of commercially available metering valve assemblies.

The additive container 350 is fitted for automatic dispensing of such incremental amounts. This is accomplished by providing a bracket 360 mounted to the sidewall 40 and having a horizontal portion with a groove cut to form a fork or yoke 362 to receive the nozzle end of container 352 with shoulder 358 resting on the upper edge of the yoke.

A plunger 370, carried by bracket 372 attached to sidewall 40 and actuated by a solenoid 374 also mounted to the sidewall, engages the bottom of the inverted aerosol can 352 through a cap 376. Activation of the solenoid forces the plunger 370 and cap 376 against the bottom of the aerosol can imparting a downward motion coupled with the engagement of the nozzle 356 by collar 362 through shoulder 358 and causes the aerosol can 352 to force the contents of the metering valve reservoir into the developer tank 310. Deactivation of the solenoid 374 allows the can 352 to return upward to its normal position and the metering valve therein to receive a fresh supply of additive.

To aid in initial mounting of the can and to allow for manufacturing tolerances in lengths of the cans used, a lost motion mechanism is employed between the plunger 370 and cap 376. A retaining washer 378 is fitted into a groove provided on plunger 370. A spring 380 surrounding the plunger 370, is interposed between washer 378 and a spider portion 382 of cap 376. Plunger 370 freely passes through a central bore 384 in spider 382. A second retaining washer 386 mounted on plunger 370 adjacent its lower end retains the cap against the biasing force of spring 380. The mechanism thus described allows the cap to be raised against the force of spring 380 to initially mount the can. Additionally, the mechanism allows for overstroke by the solenoid 374 which will merely result in additional compression of spring 380 and protrusion of plunger 370 below the underside of cap 376. Solenoid 374 is periodically activated by a manual switch or can be activated automatically by a timing mechanism in conjunction with a predetermined number of copy sheets passed through the developer tray. Such a timing mechanism is shown in application S.N. 366,268.

*Light exposure control*

Figure 7:
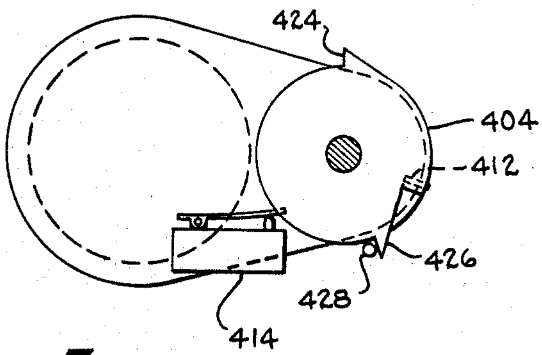
FIG. 7 is a partially sectioned top view of the exposure lamp timer mechanism.
Figure 8:
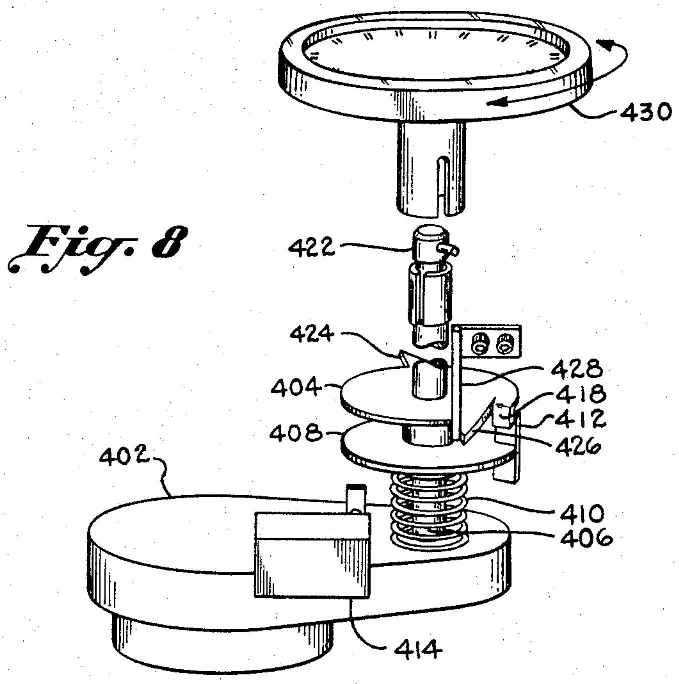
FIG. 8 is a perspective view of the exposure lamp timer mechanism.

As previously referred to, a copy sheet passing down perforated conveyor belts 30 trips lever 162 and its attached switch 164 causing the conveyor 30 to stop and the exposure lamps 7 to illuminate the window 6 for projection of the image. It was mentioned that the exposure was for a predetermined, yet adjustable, length of time. Since the photoconductive characteristics of the copy paper used the concentration of the toner dispersion, and the quality of the original document may all vary somewhat, it is sometimes necessary to vary the total amount of light exposure. The timing mechanism determining the length of the illumination period should therefore be readily adjustable. Referring now to FIGS. 7 and 8, such a mechanism is shown utilizing a timing motor 402 in combination with a variable stop member 404.

Timing motor 402 is of conventional construction comprising the usual unitary motor and gear reducing mechanism which can be readily purchased as a unit. The particular motor selected also has a built in electromagnetic clutch so that the output or drive shaft 406 is only operationally attached to the motor and gear drive while the motor is running. This allows a spring-return mechanism to be employed to return the drive shaft 406 to its initial position after each timing cycle. The spring-return mechanism consists of a disc 408 mounted to the drive shaft 406 and a spring 410 encircling the shaft 406 and attached at one end to the disc 408 and at its other end to the motor housing. Rotation of the shaft 406 by the timing motor "winds up" the spring which then returns the shaft to its initial position after shut-off by release of its tension.

Discs 408 has an attached arm 412 which protrudes both above and below the plane of the disc 408. The lower portion of arm 412 cooperates with a switch 414 mounted on the motor 402 to shut-off the motor at the end of the timing cycle.

As will be presently seen in the description of the electrical circuitry below, relay 530 which completes the circuit to the exposure lamps is wired in parallel with timing motor 402 and both are wired in series with switch 414. Opening of the switch 414, therefore, not only shuts off the timing motor 402 but the exposure lamps 7 as well.

The upper portion of arm 412 rests against a depending lug 418 on variable stop member 404. The location of lug 418 determines the starting position for the rotation of shaft 406 and disc 408 attached thereto. Since the end point of the rotation is the fixed position of switch 414, variation of the starting position will vary the time interval between activation and deactivation of the exposure lamps 7.

The position of lug 418 can be varied by rotation of dial 430 which is non-rotatably connected to a shaft 422 which mounts stop member 404. The limit of rotation of dial 430 is controlled by two ears 424 and 426 on stop member 404. Ear 426 engages a pin 428 mounted to sidewall 40 at the clockwise rotational extremity of dial 430 while ear 424 performs identically at the counterclockwise extremity.

Ears 424 and 426 are so positioned circumferentially as to allow for the maximum and minimum periods of light exposure which should be attempted to produce an acceptable copy of an original document.

*Electrical circuitry*

Referring now to FIGS. 28 and 29 a representative electrical wiring diagram is shown for the machine of this invention.

An unusual feature of the wiring can be noted by referring to the optional step-down transformer 450 shown in FIG. 28. The components in the circuit in FIG. 29 use 110 v., as normally do the components in FIG. 28. However, as can be readily appreciated from inspection of the figures, the circuitry of FIG. 29 is more complex with many smaller components while that of FIG. 28 is relatively simple insofar as interchanging of components is concerned. Therefore, when changing to 220 v. operation, with the components wired as they are, one simply changes the motors and lamps in FIG. 28 to 220 v. models and inserts a 220 volt to 110 volt step down transformer 450 which connects to the circuitry of FIG. 29 at AA and BB.

In normal 110 volt operation, transformer 450 is eliminated and short jumper wires are connected between the terminals AA1 and BB1 in FIG. 28, which would otherwise be connected to the primary of transformer 450, and terminals AA and BB in FIG. 29.

Still referring to FIGS. 28 and 29 the electrical sequence of operation is as follows: The main Off-On switch 500 is turned on actuating a developer tank pump motor 502, a main chain drive motor 504 which drives the various rollers in the machine and on exhaust fan (not shown), a dryer fan motor 506, and a vacuum fan motor 508.

The particular copy sheet tray to be used is now selected by depressing one of two buttons 512A or 512B on the top of the housing. Depressing of one or the other buttons places double pole double throw switch 512 in either position A or position B.

Depending upon whether or not the copy sheet supply in the particular tray selected has been exhausted, either print lamp 514 or paper level lamp 516 will be lighted. If print lamp 514 (located within print switch button 510*a*) is lighted, the copying cycle may be initiated by pressing print switch button 510*a*, moving print switch 510 from position A to position B, as shown in the dotted lines in FIG. 29. If, however, paper level lamp 516 of FIG. 1 is lighted by operation of paper level switches 116A or 116B as previously described, print switch 510 will be rendered electrically inoperative. This can be remedied either by selecting the other magazine tray or renewing the supply of copy sheets in the tray initially selected.

Assuming that the print lamp 514 was lighted, actuation of print switch 510 energizes stepper switch solenoid 518, which then rotates the wipers on wafer switches 520A, 520B, 520C and 520D from position 1 to position 2. The construction and operational details of solenoid 518 and wafer switches 520A–520D form no part of this invention. Further information concerning this switch may be had by referring to U.S. Patent Nos. 2,496,880 and 2,501,950. It is sufficient here to note that each pulse given to solenoids 518 serves to rotate the wiper on wafers 520 one position. Positions 1, 2 and 3 on wafers 520 are repeated around the circumference of the wafers so that the cycling is endless, position one following position three each time.

In position 2, wafer 520A completes a circuit activating either of electromagnetic clutches 108A or 108B, depending upon the position of tray selector switch 512. A mechanical drive connection is now established between either feed rollers 28*a* or 28*b*, and the main chain drive powered by motor 504. The top copy sheet is fed from feed tray 24*a* or 24*b* to rollers 120 and 122 (see FIG. 6).

As the copy sheet passes through the bite of rollers 120 and 122, and is engaged by guide 126, trip lever 128 is moved by the leading edge of the copy sheet actuating upper sheet trip switch 130 from position A to its dotted line position B.

In position B, switch 130 completes a circuit through position 2 of wafer 520B to stepper switch solenoid 518 which then moves the wipers on wafers 520A–520D to position 3.

In position 3, a circuit is completed through wafer 520D and lower paper trip switch 164 (in its position A), actuating the conveyor belt clutch driving the perforated belt conveyor 30 and at the same time actuating the conveyor brake solenoid 194 to release the brake 174. It will be remembered that both are wired in parallel for simultaneous operation and therefore are so shown in FIG. 28. At the same time a circuit path for the corona charging unit 26 is established through position 3 of wafers 520C and 520D in series with lower paper trip switch 164.

The copy sheet, after emerging from rollers 120 and 124 passes through corona charging unit 26, where it receives its electrical charge, and is picked up by the moving conveyor belts 30. The sheet travels down the belts 30, adhering to them due to the vacuum or pressure differential from the vacuum platen 140 behind the belts 30, until the sheet contacts trip lever 162 actuating lower paper trip switch 164, moving it from position A to position B, shown in the dotted lines.

Switch 164 in position B breaks the circuits powering corona charging unit 26, the conveyor belt clutch and brake solenoid 194, causing the belts 30 and the copy sheet thereon to halt.

Position B of lower copy sheet trip switch 164 completes a circuit energizing exposure lamp relay 530 and initiating the exposure lamp timing mechanism through activation of timing motor 402.

Exposure lamp relay 530 breaks contacts 530A and 530C which are series wired into the corona charging and heater circuits, respectively, and makes contacts 530B completing a circuit to exposure lamps 7.

The exposure lamps remain lighted until timing motor 402 has rotated disc 408 (as more clearly shown in FIGS. 7 and 8) to a point where arm 412 moves switch 414 from its normal position A to position B, which then breaks the circuit to exposure lamp relay 530.

Switch 414 momentarily placed in position B by arm 412 activates stepper switch solenoid 518 moving the wafers 520A–520D to position 1 again.

In position 1, wafer 520D completes a circuit through position B of lower copy sheet trip switch 164 (which is being held in position B by the copy sheet) reactivating the conveyor clutch and brake 174. The copy sheet now moves into the developer tank station at which point it is engaged by the developer tank rollers 202 and 204 first and then the exit conveyor belt 34 both of which are constantly powered, being geared to the chain drive mechanism previously alluded to. Thus the perforated belt conveyor 30 will be shut off after the trailing edge of the copy sheet loses contact with trip lever 162 on switch 164, but the copy sheet will continue to travel toward exit tray 36.

As soon as the copy sheet clears lever 162, switch 164 is returned to position A and a new cycle can be initiated. It should be noted with reference to wafer 520C that the circuit through print switch 510 can only be completed when the wiper is in position 1. In addition the print circuit is series wired through contacts 532A on multiple copy conveyor relay 532. The coil of relay 532 is energized by a circuit through position one of wafer 520A, and position B of lower trip switch 164 breaking contacts 532A and making contacts 532B and 532C. Thus, deactivation of the print circuit until the first copy sheet has cleared trip lever 162 and its switch 164 is assured.

*Multiple copies*

For multiple copies, a 22 position rotary stepper switch 441 having two wafers 442A and 442B is used.

Switch 441 is fitted with an indicating dial 444 (shown in FIG. 1) located on top of the machine which is used to manually rotate the wipers on the wafers. Wafer position one on switch 441 is indicated as infinity on the dial, wafer position 2 is indicated S for single copies, while wafer positions 4 to 22 are numbered as 2 through 20. Rotary switch 441 has an actuating solenoid 440 similar to that of previously mentioned solenoid 518. Positions 3 to 22 on wafer 442B are all wired in parallel to one another and in series with solenoid 440 of switch 441. Each pulse rotates the solenoid until wafer position 2 (position S on the dial) is reached. Positions 1 and 3 to 22 on wafer 442A are wired in parallel to one another and in series with contacts 532C on multiple copy conveyor relay 532 to bypass print switch 510.

It should be noted that between the S and 2 positions on the dial, a dot on the dial corresponds to wafer position 3. This marking is readily appreciated by observing that each time a copy is made in any of the multiple positions, switch 441 is pulsed. Hence for 2 copies one sets the dial to position 2 (wafer position or contact 4). As the first copy is made, switch 441 is pulsed to the "dot" position on the dial and when the second copy is made the switch is pulsed to dial position S.

Thus, when rotary switch 441 is in position one (labeled "infinity" on the dial) the print switch 510 is bypassed every time contacts 532C are closed; but when the rotary switch 441 is in wafer positions 3 to 22 solenoid 440 on switch 441 is also pulsed, moving the wipers toward wafer position 2 which is the single copy position on the dial.

The foregoing description and drawings should be considered as illustrative of preferred embodiments and that changes and modifications may be made without departing from the scope of the invention as measured by the appended claims.

We claim:

1. In an electrostatic printing machine having an exposure station and an imaging station with a lens projection system therebetween, the combination of:

(a) illumination means positioned adjacent said exposure station for the projection of an entire image of subject matter placed at the exposure station;
(b) copy sheet supply means in said machine for the storage of photoconductive copy sheets;
(c) means for moving said copy sheets individually from said supply means to said imaging station;
(d) charging means positioned between said supply means and said imaging station to place an electrical charge on a photoconductive copy sheet;
(e) initiating means at the imaging station and activated by a moving copy sheet to energize said illumination means; and
(f) timing means to control the amount of illumination projected onto a copy sheet at the imaging station to selectively discharge the electrical charge thereon.

2. An electrostatic printing machine comprising a housing having therein:

(a) an opening forming a document exposure station; illuminating means to illuminate the entire surface of a document placed over said opening;
(b) reflecting means arranged to reflect an image of said surface over said opening;
(c) optical projecting means positioned to receive a reflected image of said document from said reflecting means;
(d) an imaging station upon which the reflected image of said document can be projected;
(e) copy sheet supply means, including a plurality of copy sheet trays and feed means for each tray;
(f) means for electively activating one of said feed means to select a copy sheet;
(g) charging means to impart an electrical charge to the copy sheet;
(h) first roller means to pass said copy sheet through said charging means;
(i) conveyor belt means to carry said sheet from said charging means to said imaging station;
(j) vacuum means to retain said copy sheet to said conveyor means;
(k) stop means to halt said conveyor means when said copy sheet has reached a predetermined point at said imaging station;
(l) timing means to initiate the illuminating means when said conveyor belt has been stopped, and to extinguish the illuminating means and reactivate the conveyor means at the elapse of a predetermined period of time, said illuminating means causing an image to be projected onto the charged copy sheet to selectively discharge portions thereof;
(m) a liquid developer station containing a pool of liquid having charged particles therein to develop the charged image on said copy sheet;
(n) second roller means to receive said sheet from said conveyor means and pass the sheet into the developer station;
(o) third roller means to receive said developed copy sheet from said station and wring off excess liquid therefrom;
(p) a drying station adjacent said third roller means to dry any excess moisture from said copy sheet; and
(q) an exit port in said housing to allow said dried, developed copy sheets to be removed from the housing.

3. In an electrostatic photocopy machine having a housing:

(a) a window frame positioned on the top surface of said housing, a transparent window carried on the upper surface of said frame and spaced from the top surface of said housing;
(b) illumination means carried by said housing below said frame;

(c) an optical bench member carried by said housing including a mirror mechanism pivotally mounted and adjustable on said bench member and secured thereto by adjusting and retaining means, said adjusting and retaining means including biasing means applied to the mirror mechanism to bias the mirror mechanism in one direction with respect to the bench member and at least one adjustable means applied to the mirror mechanism providing a constant force opposing said bias, and a cylindrical lens member adjustably mounted on said bench member by bracket means having at least two fixed rib-like members and at least one wedge-like member circularly, equidistantly spaced about the exterior cylindrical surface of the lens member and supporting the said lens member, said wedge-like member adjustably mounted in an inclined groove in said bracket means for cammed movement of the wedge-like member toward the lens member, for adjusting and securing said lens member on said bench member;

(d) a projection chamber having an imaging station and an opening opposite said imaging station, said lens member being positioned in said opening to project an image into said chamber against said station; and (e) means for adjustably moving said optical bench as a unit relative to said window and said imaging station to effect the focus and size of the projected image.

4. In an electrostatic printing machine having an exposure station and in imaging station with a lens projection system therebetween, the combination of:

(a) copy sheet supply means in said machine for the storage of photoconductive copy sheets;

(b) means for moving said copy sheets from said supply means to said imaging station;

(c) charging means positioned between said supply means and said imaging station to place an electrical charge on the photoconductive copy sheet;

(d) illumination means positioned adjacent said exposure station for the projection of an image of subject matter placed at the exposure station onto a copy sheet at the imaging station to selectively discharge the electrical charge on the copy sheet;

(e) initiating means at the imaging station and activated by the moving copy sheet to energize said illumination means;

(f) timing means to control the amount of illumination projected onto the copy sheet, said timing means including;

(1) a timing motor energizable by said initiating means and a housing therefor;

(2) a disc member rotated by said motor;

(3) a switch member on said machine operable to deactivate said motor and said illumination means;

(4) an actuating arm on said disc member and positioned to actuate said switch upon rotation of said disc by said motor;

(5) biasing means including a spring operationally attached to said disc to bias the arm on said disc away from said switch, said biasing means being of lesser strength than said motor.

References Cited

UNITED STATES PATENTS

| | | | |
|---|---|---|---|
| 2,235,844 | 3/1941 | Nelson | 271—41 |
| 2,684,656 | 7/1954 | Ransburg | 118—51 |
| 2,959,095 | 11/1960 | Magnusson | 88—24 |
| 1,085,866 | 2/1914 | Jantsch | 88—24 |
| 3,282,177 | 11/1966 | Stanton | 95—1.7 |

JOHN M. HORAN, *Primary Examiner.*

U.S. Cl. X.R.

355—11, 14

PO-1050
(5/69)

UNITED STATES PATENT OFFICE
CERTIFICATE OF CORRECTION

Patent No. 3,416,860 Dated December 17, 1968

Inventor(s) S. Mihojevich et al.

It is certified that error appears in the above-identified patent and that said Letters Patent are hereby corrected as shown below:

In the drawings, Sheet 1, Fig. 2, delete reference numeral 62 and its lead line; Sheet 11, Fig. 29, delete reference numeral 38 and its lead line. Column 1, line 22, after "means" insert -- being --; line 35, after "wall" insert -- and --; line 63, for product read -- produce --; and line 66, for "photocopies" read -- photocopier --. Column 2, line 1, "248,249" should read -- 249,248 --. Column 4, line 3, after "view" insert -- taken along the lines 23-23 in Fig. 22 and --; line 48, for "affect" substitute -- have little affect on --; line 64, for "mechanism" read -- mechanisms --, and for "and" read -- or --. Column 5, line 21, after "has" insert -- a --; line 50, after "Figs." insert -- 6 and --. Column 6, line 12, after "has" insert -- a spring 92 mounted thereon having --; line 14, for "to" read -- or --; and line 61, for "or" read -- on --. Column 7, lines 25, 35 and 73 and Column 8, line 75, "248,249" should be -- 249,248 --. Column 9, line 13, for "FIGURE" read -- Figure--; and line 20, for "opopsite" read -- opposite --. Column 11, line 12, for "15" read -- 16 --. Column 12, line 3, after "front" insert -- and --, and for "length" read -- lengths --; line 24, for "and" read -- of --; line 36, for "lines" read -- line --; line 40, for "84" read -- 284 --; and line 56, for "as" read -- An --. Column 13, line 62, for "charge" read -- charged --. Column 14, line 61, for "used" read -- used, --. Column 15, line 9, for "Discs" read -- Disc --; line 61, for "AA1 and BB1" read -- AA' and BB' --; line 68, for "on" read -- an --; and line 72, for "512A or 512B" read -- 512a or 512b--. Column 16, line 23, for "solenoids" read -- solenoid --; and line 74, for "contacts" read -- contact --. Column 17, lines 42 and 49, for "S" read -- "S" --; line 43, for "2 through 20" read -- "2" through "20" --; line 53, for "S and 2" read -- "S" and "2" --; line 54, for "dial" read -- Dial --; line 58, for "2" read -- "2" --; and line 61, for "S" read -- "S" --. Column 19, line 2, for "in" read -- an --.

SIGNED AND SEALED
MAY 19 1970

(SEAL)
Attest:

Edward M. Fletcher, Jr.
Attesting Officer

WILLIAM E. SCHUYLER, JR.
Commissioner of Patents